(12) United States Patent
Yang et al.

(10) Patent No.: US 9,146,634 B2
(45) Date of Patent: Sep. 29, 2015

(54) HANDHELD DEVICE AND HOMESCREEN MANAGEMENT METHOD THEREOF

(71) Applicant: HTC CORPORATION, Taoyuan, Taoyuan County (TW)

(72) Inventors: Chih-Wei Yang, Taoyuan (TW); Huan-Chun Su, Taoyuan (TW); Wei-Nien Shih, Taoyuan (TW)

(73) Assignee: HTC CORPORATION (TW)

( * ) Notice: Subject to any disclaimer, the term of this patent is extended or adjusted under 35 U.S.C. 154(b) by 80 days.

(21) Appl. No.: 13/848,963

(22) Filed: Mar. 22, 2013

(65) Prior Publication Data

US 2013/0249841 A1    Sep. 26, 2013

Related U.S. Application Data

(60) Provisional application No. 61/614,677, filed on Mar. 23, 2012.

(51) Int. Cl.
*G06F 3/041* (2006.01)
*G06F 3/0486* (2013.01)
(Continued)

(52) U.S. Cl.
CPC ............ *G06F 3/0412* (2013.01); *G06F 3/0486* (2013.01); *G06F 3/04883* (2013.01); *H04M 1/72583* (2013.01); *H04M 2250/22* (2013.01)

(58) Field of Classification Search
CPC ....... G06F 3/01; G06F 3/048; G06F 3/04842; G06F 3/0488; G06F 3/041; G06F 3/0412; G06F 3/0486; G06F 3/04883; G09G 5/00; H04W 88/02; H04M 1/72583; H04M 2250/22

USPC .......... 345/156, 168, 747; 715/702, 754, 765, 715/778; 455/566
See application file for complete search history.

(56) References Cited

U.S. PATENT DOCUMENTS

| | | | |
|---|---|---|---|
| 2003/0067485 A1 * | 4/2003 | Wong et al. | ................... 345/747 |
| 2009/0058821 A1 | 3/2009 | Chaudhri et al. | |

(Continued)

FOREIGN PATENT DOCUMENTS

| | | |
|---|---|---|
| CN | 101211250 A | 7/2008 |
| CN | 101836182 A | 9/2010 |
| CN | 102236516 A | 11/2011 |

OTHER PUBLICATIONS

European Office Action for European Patent Application No. 13001497.0, Date of Mailing: Jun. 27, 2013.

(Continued)

*Primary Examiner* — Lun-Yi Lao
*Assistant Examiner* — Johny Lau
(74) *Attorney, Agent, or Firm* — Cantor Colburn LLP

(57) ABSTRACT

A handheld device and a homescreen management method thereof are provided. The handheld device comprises a touch screen and a processor electrically connected to the touch screen. The touch screen displays a user interface, and senses a long pressing of an object and generates a first touch signal. The processor executes a homescreen management program according to the first touch signal, and enables the touch screen to display a homescreen management interface corresponding to the homescreen management program. The homescreen management interface comprises a page navigation area and a candidate object area. The page navigation area comprises a first page image and the candidate object area comprises an object image. The touch screen further senses a pressing of the object and generates a second touch signal, and the processor adds the object image into the first page image according to the second touch signal.

18 Claims, 6 Drawing Sheets

(51) Int. Cl.
*H04M 1/725* (2006.01)
*G06F 3/0488* (2013.01)

(56) References Cited

U.S. PATENT DOCUMENTS

2010/0269040 A1* 10/2010 Lee .............................. 715/702
2010/0295789 A1* 11/2010 Shin et al. .................... 345/168
2012/0030623 A1   2/2012 Hoellwarth

OTHER PUBLICATIONS

D. Pogue, iPhone the missing manual The book that should have been in the box, 4th Ed., O'Reilly Media, Inc, 2010, pp. 1-58.

Samsung, Samsung Galaxy Tab 8.9 Android Tablet User Manual, Samsung Electronics America (SEA), Inc., 2011, pp. 1-188.

Supplementary European Search Report for European Patent Application No. 13001497.0; Date of Mailing: Jun. 13, 2013.

Chinese Office Action corresponding to Application No. 201310096406.X; Date of Mailing: Jul. 28, 2015, with English translation.

TW Office Action corresponding to TW Patent Application No. 102110177; Mailing date: May 15, 2015 with English translation.

* cited by examiner

HANDHELD DEVICE AND HOMESCREEN MANAGEMENT METHOD THEREOF

CROSS-REFERENCES TO RELATED APPLICATIONS

This application claims priority to U.S. Provisional Application Ser. No. 61/614,677, filed on Mar. 23, 2012, the entire contents of which are incorporated herein by reference.

BACKGROUND OF THE INVENTION

1. Field of the Invention

The present invention relates to a handheld device and a homescreen management method thereof; and more particularly, the present invention relates to a handheld device and a homescreen management method thereof for managing homescreens of a user interface.

2. Descriptions of the Related Art

Currently, handheld devices used by the general consumers (e.g., smart phones, tablet computers and notebook computers) have a plurality of homescreens for placement of objects by users. These objects are applications (APPs), widgets, shortcuts and the like. However, when a new object is to be added into such a handheld device, the new object is usually added into the last homescreen or inserted in some other homescreen having a blank block, and then manual ordering is performed by the user. For example, if the user's handheld device has seven homescreens in total and only the seventh homescreen has a blank block available for accommodating the new object, then the new object will be placed in the seventh homescreen having the blank block. Thereafter, if the user desires to move the new object to the first homescreen, then the new object must be moved from the seventh homescreen to the first homescreen all the way through the second to the sixth homescreens. Therefore, homescreen management in the conventional handheld devices is still not so user-friendly and intuitive.

Accordingly, an urgent need exists in the art to provide a solution of managing homescreens of a handheld device more user-friendly to improve the convenience in use.

SUMMARY OF THE INVENTION

In order to manage homescreens of the existing handheld devices more user-friendly and more intuitively, the present invention provides a handheld device and a homescreen management method thereof.

The handheld device of the present invention comprises a touch display panel and a processor. The touch display panel is configured to display a user interface, and sense a long pressing action of an object to generate a first touch signal. The processor is electrically connected with the touch display panel, and is configured to execute a homescreen management program according to the first touch signal, and enable the touch display panel to display a homescreen management interface corresponding to the homescreen management program, wherein the homescreen management interface comprises a page navigation area and a candidate object area, and the page navigation area comprises a first page image and the candidate object area comprises an object image. The touch display panel further senses a pressing action of the object to generate a second touch signal, and the processor adds the object image into the first page image according to the second touch signal.

The homescreen management method of the present invention is for use in the aforesaid handheld device, and the handheld device comprises a touch display panel and a processor electrically connected to the touch display panel. The touch display panel is configured to display a user interface and sense a long pressing action of an object to generate a first touch signal, and the homescreen management method is executed by the processor and comprises the following steps of: (a) executing a homescreen management program according to the first touch signal; and (b) enabling the touch display panel to display a homescreen management interface corresponding to the homescreen management program, wherein the homescreen management interface comprises a page navigation area and a candidate object area, and the page navigation area comprises a first page image and the candidate object area comprises an object image. The touch display panel further senses a pressing action of the object to generate a second touch signal, and the homescreen management method further comprises the following step of: (c) adding the object image into the first page image according to the second touch signal.

As can be known from the above description, the handheld device and the homescreen management method thereof of the present invention sense the long pressing action of the user through the touch display panel and then the homescreen management program is executed by the processor, and the homescreen management program allows the user to conveniently manage an object in the candidate object area corresponding to homescreens. With the present invention, the user can manage the homescreens of the handheld device more user-friendly and more intuitively, and this allows for convenience in use.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following descriptions, a handheld device and a homescreen management method thereof of the present invention will be explained with reference to embodiments thereof. However, these embodiments are not intended to limit the present invention to any environments, applications or implementations described in these embodiments. Therefore, description of these embodiments is only for purpose of illustration rather than to limit the present invention. It shall be appreciated that, in the following embodiments and the attached drawings, elements not directly related to the present invention are omitted from depiction.

Figure 1:
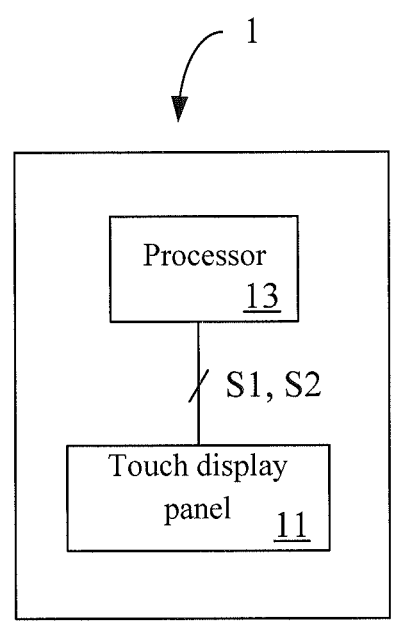
FIG. 1 depicts a functional block diagram of a handheld device according to a first embodiment of the present invention.
Figure 2:
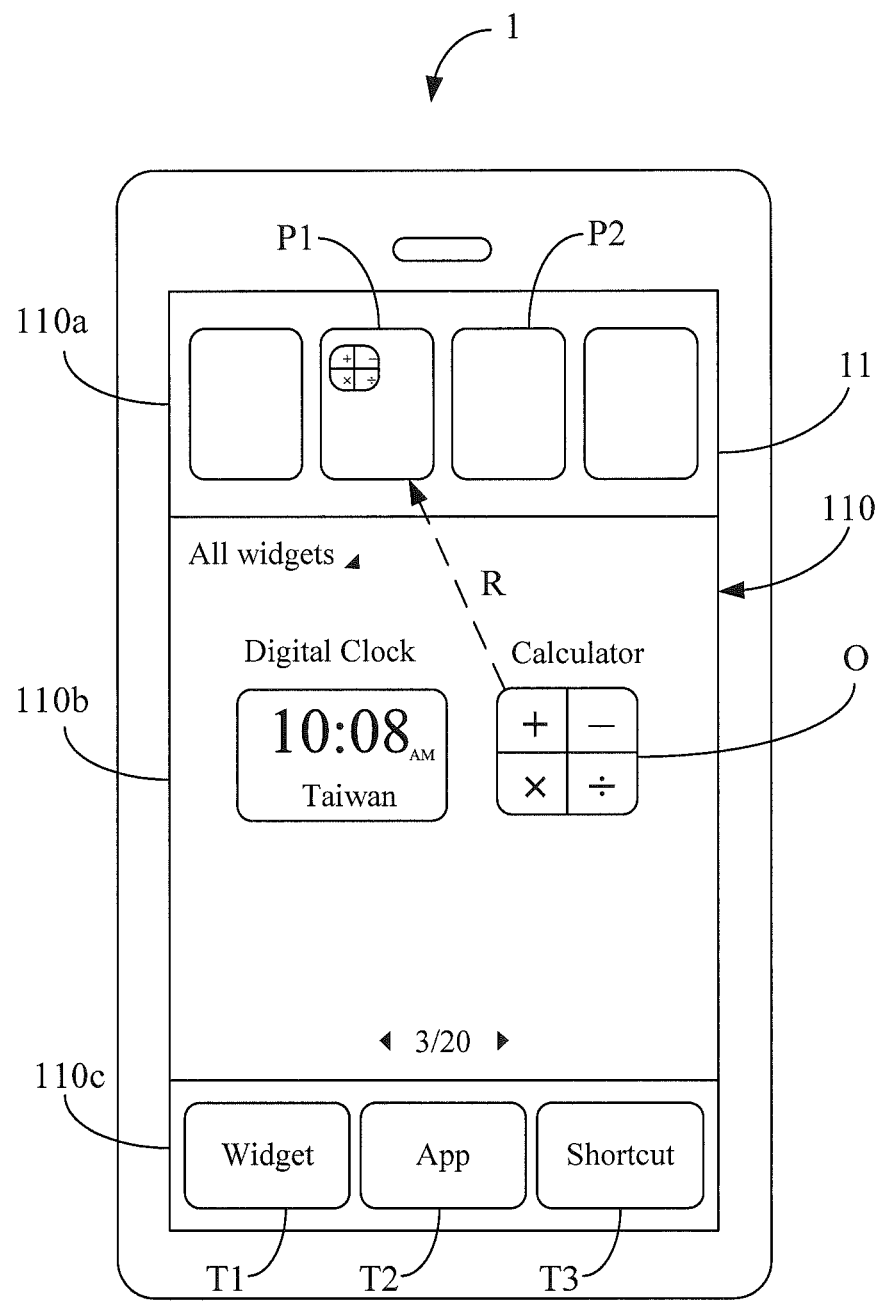
FIG. 2 depicts a homescreen management interface of the handheld device according to the first embodiment of the present invention.

A handheld device 1 according to a first embodiment of the present invention is shown in FIG. 1 and FIG. 2. FIG. 1 depicts a functional block diagram of the handheld device 1, and FIG. 2 depicts a homescreen management interface 110 of the handheld device 1. The handheld device 1 comprises a touch display panel 11 and a processor 13. The processor 13 is electrically connected with the touch display panel 11.

The touch display panel 11 displays a user interface, and senses a long pressing action of an object to generate a first touch signal S1. The long pressing action is to press a region of the touch display panel 11 which corresponds to a blank area of the user interface, and the object is a user's finger or some other object that can trigger the touch display panel 11 for sensing. In other words, when the user long presses the blank area of the user interface displayed by the touch display panel 11, the processor 13 executes a homescreen management program according to the first touch signal S1. In this case, the touch display panel 11 of the handheld device 1 displays a homescreen management interface 110 corresponding to the homescreen management program, and the user can proceed to manage the contents of homescreens. Hereinafter, how the present invention manages the contents of the homescreens will be described in detail. As shown in FIG. 2, the homescreen management interface 110 comprises a page navigation area 110a, a candidate object area 110b and a group classification area 110c. The page navigation area 110a is configured to display images of the homescreens and at least comprises a first page image P1; the candidate object area 110b comprises at least an object image O; and the group classification area 110c comprises at least one object classification. In this embodiment, the group classification area 110c comprises a widget classification T1, an application classification T2 and a shortcut classification T3. Moreover, when the user clicks a certain classification, the candidate object area 110b immediately displays an object image of the classification. For example, if the user clicks the widget classification T1, then the candidate object area 110b will immediately display an object image of a widget belonging to the widget classification T1. It shall be particularly appreciated that, the way of performing group classification on objects by the present invention is not limited thereto.

Next, the touch display panel 11 further senses a pressing action of the user's finger to generate a second touch signal S2. Further speaking, the pressing action is to press a first region of the touch display panel 11 that corresponds to the object image O, with the first region being a relative position of the object image O in the homescreen management interface 110; and the pressing action further comprises sliding to a second region corresponding to the first page image P1 from the object image O along a path R between the object image O and the first page image P1, with the second region being a relative position of the first page image P1 in the homescreen management interface 110. Furthermore, during the sliding along the path R, the touch display panel 11 displays the object image O at a gradually decreasing scale based on the sliding action.

Then, when the object image O is dragged to the first page image P1, the processor 13 adds the object image O into the first page image P1 according to the second touch signal S2. In this case, the touch display panel 11 displays the object image O in the first page image P1 at an original scale of an object corresponding to the object image O to a first homescreen corresponding to the first page image P1, as shown in FIG. 2.

After the processor 13 adds the object image O into the first page image P1, the object corresponding to the object image O is also added into the first homescreen corresponding to the first page image P1. Thus, with the present invention, the user can easily add the object into the first homescreen without the need of executing ordering or additional complex management on the object.

In addition, the page navigation area 110a further comprises a second page image P2, which may or may not be adjacent to the first page image P1. The processor 13 further determines that the second page image P2 contains no blank block according to the second touch signal S2 (i.e., in terms of a space of a second homescreen corresponding to the second page image P2), and thus adds the object image O into the first page image P1 which is closest to the second page image P2 and still has a blank block. Herein, a blank block refers to a space block in a homescreen where widgets, applications or shortcuts can be stored.

Figure 3:
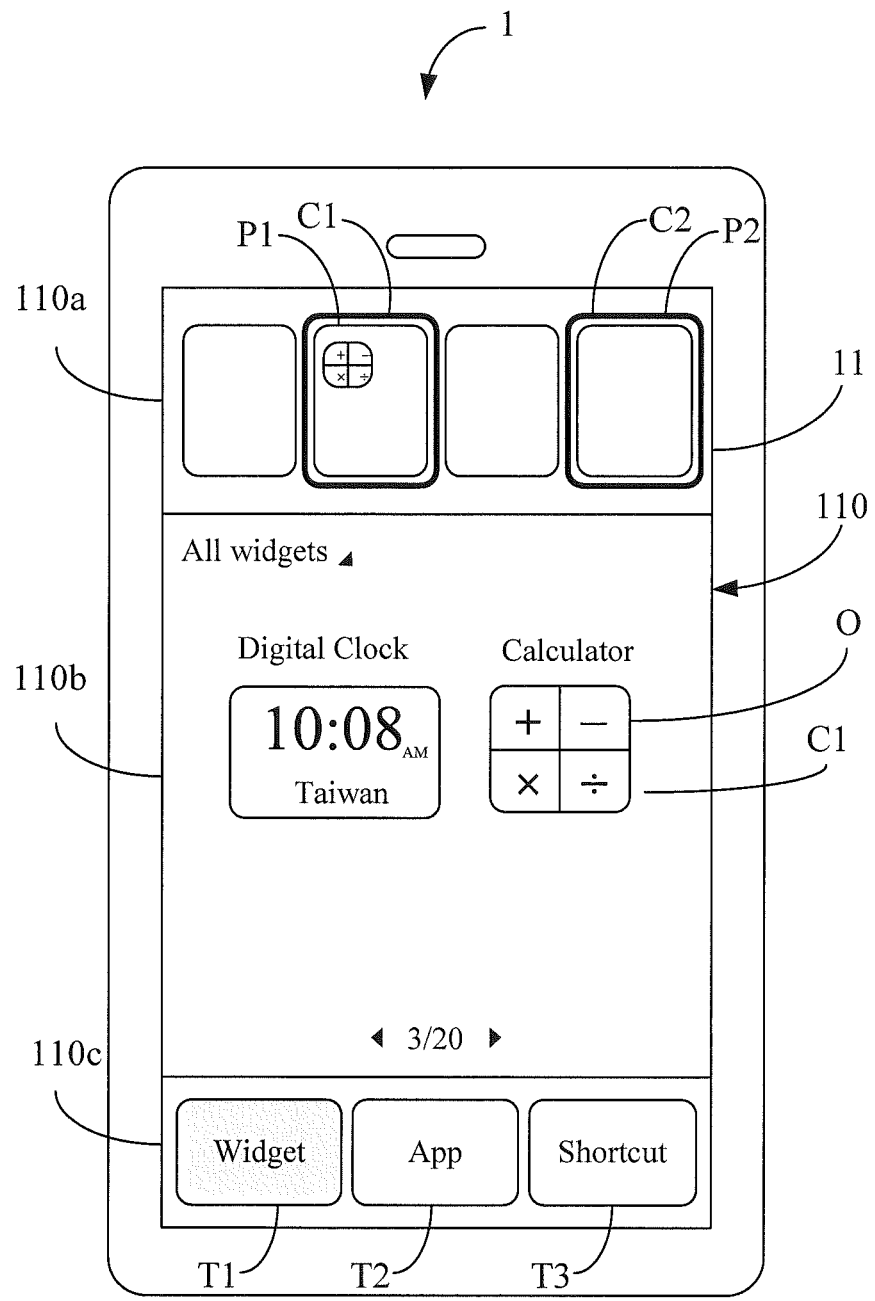
FIG. 3 depicts a homescreen management interface of a handheld device according to a second embodiment of the present invention.

Furthermore, the user may also manage the contents of the homescreens through different pressing actions, and this will be described with reference to a second embodiment. Refer to both FIG. 1 and FIG. 3 for the second embodiment of the present invention. FIG. 3 depicts a homescreen management interface 110 of a handheld device 1. The handheld device 1 of the second embodiment comprises the same elements as the handheld device 1 of the first embodiment, and can execute all the operations that can be executed by the handheld device 1 of the first embodiment, so the following description will focus on differences therebetween.

In the second embodiment, the pressing action is to press or click a first region of the touch display panel 11 that corresponds to the object image O, with the first region being a relative position of the object image O in the homescreen management interface 110. In this case, the touch display panel 11 generates a fore touch signal S21. The pressing action further comprises pressing or clicking a second region (not shown) of the touch display panel 11 that corresponds to the first page image P1, with the second region being a relative position of the first page image P1 in the homescreen management interface 110. In this case, the touch display panel 11 generates an after touch signal S22.

After the fore touch signal S21 and the after touch signal S22 of the second touch signal S2 are generated, the processor 13 adds the object image O into the first page image P1 according to the fore touch signal S21 and the after touch signal S22. At this point, the object corresponding to the object image O is also added into the first homescreen corresponding to the first page image P1.

Furthermore, the page navigation area 110a further comprises a second page image P2. If the processor 13 determines that the first page image P1 has a blank block but the second page image P2 has no blank block when the touch display panel 11 generates the fore touch signal S21, then the processor 13 enables the touch display panel 11 to display a first color frame C1 (e.g., a green frame) around the first page image P1 and display a second color frame C2 (e.g., a red frame) around the second page image P2 simultaneously so that the user can tell whether each of the page images has a blank block through the colors.

In other implementations, the page navigation area 110a also comprises the second page image P2, which may or may not be adjacent to the first page image P1; however, the difference is that, the user originally desires to add the object image O into the second page image P2 but the second page image P2 has no blank block available for accommodating the object image O. In other words, the after touch signal S22 is generated in response to pressing or clicking on a third region (not shown) of the touch display panel 11 which corresponds to the second page image P2, with the third region being a relative position of the second page image P2 in the homescreen management interface 110. However, in this case, the second page image P2 has no blank block. Therefore, the processor 13 determines that the second page image P2 contains no blank block according to the after touch signal S22 (i.e., in terms of a space of a second homescreen corresponding to the second page image P2), and thus adds the object image O into the first page image P1 which is closest to the second page image P2 and still has a blank block. Herein, a blank block refers to a space block in a homescreen where widgets, applications or shortcuts can be stored.

Alternatively, if the processor 13 determines that neither the current second page image P2 nor other page images (excluding the first page image P1) contain a blank block, then the first page image P1 is a new page image that is newly added by the processor 13. In this case, the processor 13 further enables the touch display panel 11 to display the first page image P1 in the page navigation area 110a, and adds the object image O into the first page image P1 according to the fore touch signal S21 and the after touch signal S22.

Similarly, in other implementations, the fore touch signal S21 may be generated in response to pressing or clicking on the second region of the touch display panel 11 which corresponds to the first page image P1, and the after touch signal S22 may be generated in response to pressing or clicking on the first region of the touch display panel 11 which corresponds to the object image O. Then, the processor 13 adds the object image O into the first page image P1 according to the fore touch signal S21 and the after touch signal S22. At this point, the object corresponding to the object image O is also added into the first homescreen corresponding to the first page image P1.

Figure 4:
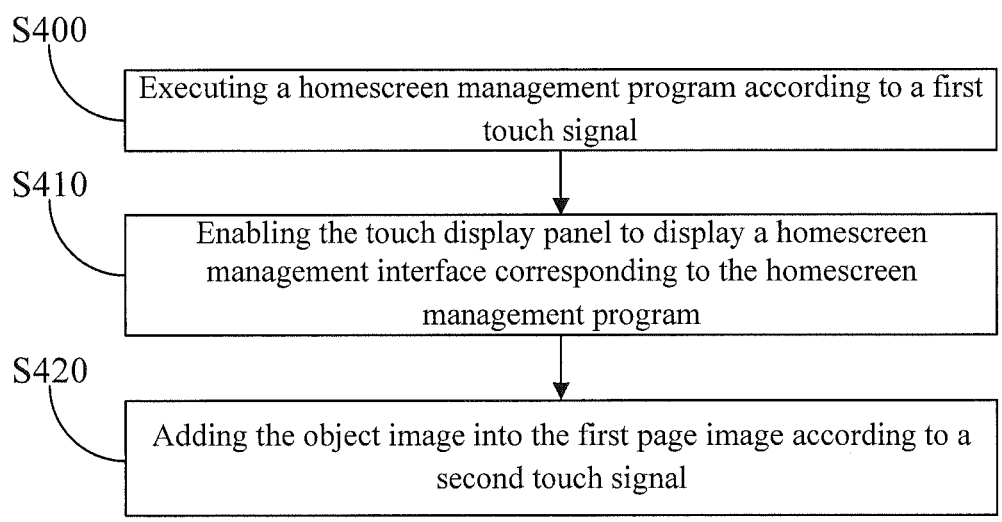
FIG. 4 depicts a flowchart diagram of a homescreen management method according to a third embodiment of the present invention.

A third embodiment of the present invention is a homescreen management method, a flowchart diagram of which is depicted in FIG. 4. The homescreen management method is for use in a handheld device (e.g., the handheld device 1 of the first embodiment). The handheld device comprises a touch display panel and a processor. The processor is electrically connected to the touch display panel.

The touch display panel displays a user interface and senses a long pressing action of an object to generate a first touch signal. The long pressing action is to press a region of the touch display panel which corresponds to a blank area of the user interface, and the object is a user's finger or some other object that can trigger the touch display panel for sensing. That is, when the user long presses the blank area of the user interface displayed by the touch display panel, the homescreen management method is executed by the processor. Firstly, step S400 is executed to execute a homescreen management program according to the first touch signal; and then step S410 is executed to enable the touch display panel to display a homescreen management interface corresponding to the homescreen management program.

Further speaking, the homescreen management interface comprises a page navigation area, a candidate object area and a group classification area. The page navigation area is configured to display images of the homescreens and at least comprises a first page image; the candidate object area comprises at least an object image; and the group classification area comprises at least one object classification. In this embodiment, the group classification area comprises a widget classification, an application classification and a shortcut classification. Moreover, when the user clicks a certain classification, the candidate object area only displays an object image of the classification. For example, if the user clicks the widget classification, then the candidate object area will only display an object image of the widget classification. It shall be particularly appreciated that, the way of performing group classification on objects by the present invention is not limited thereto.

Thereafter, the touch display panel further senses a pressing action of the object to generate a second touch signal. At this point, step S420 is further executed to add the object image into the first page image according to the second touch signal.

After the processor adds the object image into the first page image, the object corresponding to the object image is also added into the first homescreen corresponding to the first page image. Thus, with the present invention, the user can easily add the object into the first homescreen without the need of executing ordering or additional complex management on the object.

In an implementation, the pressing action is to press a first region of the touch display panel that corresponds to the object image, with the first region being a relative position of the object image in the homescreen management interface; and the pressing action further comprises sliding to a second region corresponding to the first page image along a path between the object image and the first page image, with the second region being a relative position of the first page image in the homescreen management interface. Furthermore, during the sliding along the path, the touch display panel displays the object image at a gradually decreasing scale based on the sliding action.

Then, when the object image is dragged to the first page image, the processor adds the object image into the first page image according to the second touch signal. In this case, the touch display panel displays the object image in the first page image at an original scale of an object corresponding to the object image to a first homescreen corresponding to the first page image.

In addition to the aforesaid steps, the homescreen management method of the third embodiment can also execute all the operations and functions of the handheld device set forth in the first embodiment. How the homescreen management method of the third embodiment executes these operations and functions can be readily appreciated by those of ordinary skill in the art based on the explanation of the first embodiment, and thus will not be further described herein.

Figure 5:
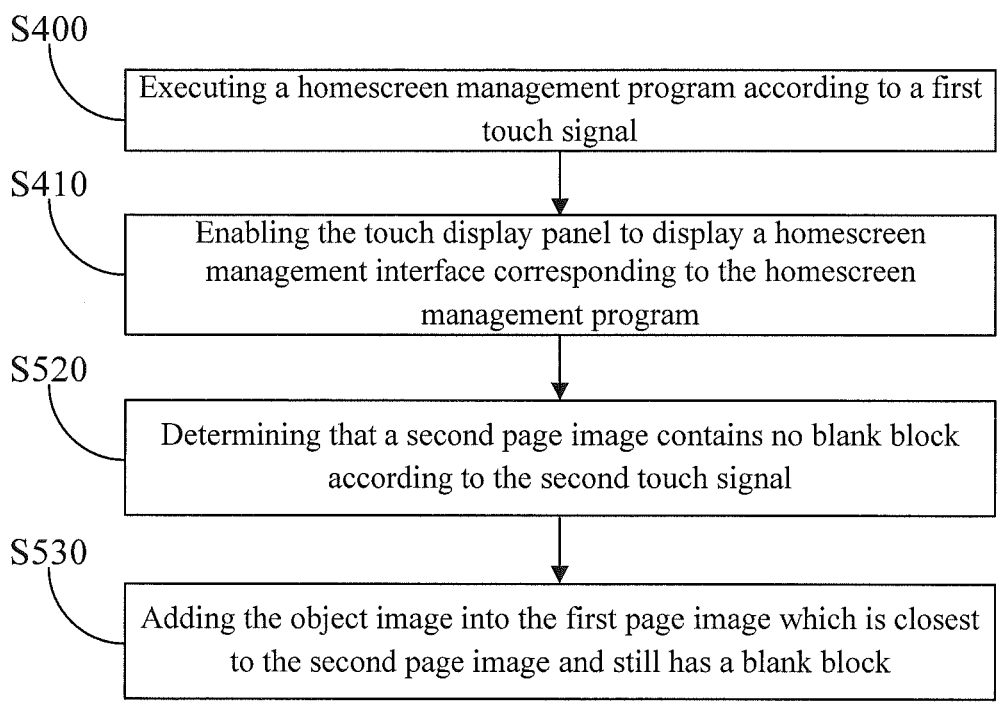
FIG. 5 depicts a flowchart diagram of a homescreen management method according to a fourth embodiment of the present invention.

A fourth embodiment of the present invention is a homescreen management method, a flowchart diagram of which is depicted in FIG. 5. The homescreen management method is for use in a handheld device (e.g., the handheld device 1 of the first embodiment). The homescreen management method in the fourth embodiment firstly executes the same steps S400 and S410 as in the third embodiment.

In this embodiment, the page navigation area further comprises a second page image, which may or may not be adjacent to the first page image. Step S520 is executed to further determine, by the processor, that the second page image contains no blank block according to the second touch signal (i.e., in terms of a space of a second homescreen corresponding to the second page image). Next, step S530 is executed to add the object image into the first page image which is closest to the second page image and still has a blank block. The blank block refers to a space block in a homescreen where widgets, applications or shortcuts can be stored.

In addition to the aforesaid steps, the homescreen management method of the fourth embodiment can also execute all the operations and functions of the handheld device set forth in the first embodiment. How the homescreen management method of the fourth embodiment executes these operations and functions can be readily appreciated by those of ordinary skill in the art based on the explanation of the first embodiment, and thus will not be further described herein.

Figure 6:
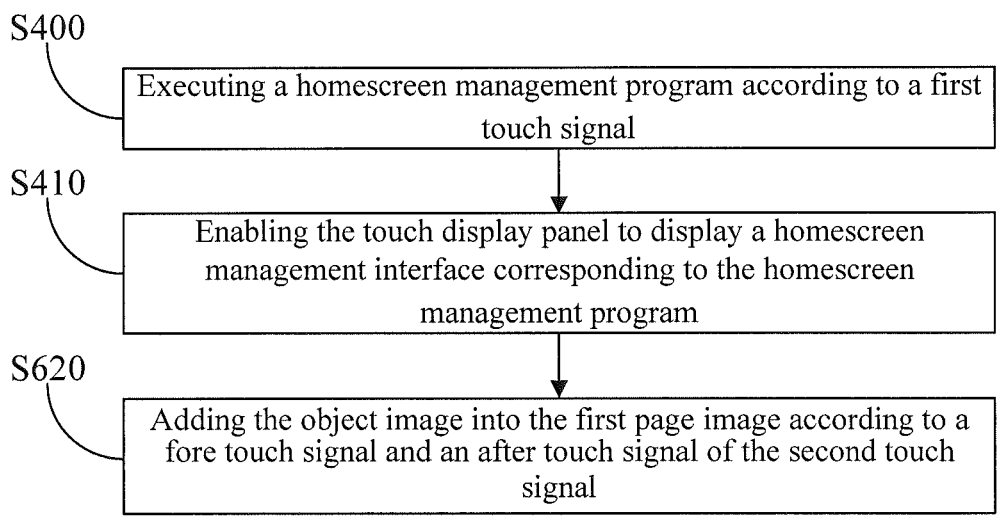
FIG. 6 depicts a flowchart diagram of a homescreen management method according to a fifth embodiment of the present invention.

In another implementation, the user may also manage the contents of the homescreens through different pressing actions, which will be described with reference to a fifth embodiment. A flowchart diagram of a homescreen management method according to the fifth embodiment of the present invention is depicted in FIG. 6. The homescreen management method is for use in a handheld device (e.g., the handheld device 1 of the second embodiment). The homescreen management method in the fifth embodiment firstly executes the same steps S400 and S410 as in the third embodiment. In the fifth embodiment, the pressing action is to press or click a first region of the touch display panel that corresponds to the object image, with the first region being a relative position of the object image in the homescreen management interface. In this case, the touch display panel generates a fore touch signal. The pressing action further comprises pressing or clicking a second region of the touch display panel that corresponds to the first page image, with the second region being a relative position of the first page image in the homescreen management interface. In this case, the touch display panel generates an after touch signal.

After the fore touch signal and the after touch signal of the second touch signal are generated, step S620 is then executed to add the object image into the first page image according to the fore touch signal and the after touch signal by the processor. Thus, the object corresponding to the object image is also added into the first homescreen corresponding to the first page image.

Furthermore, the page navigation area further comprises a second page image. When the touch display panel generates the fore touch signal, the step S620 further comprises the following step (not shown): determining that the first page image has a blank block but the second page image has no blank block according to the fore touch signal by the processor. In this case, the step S620 further comprises the following step (not shown): the processor enables the touch display panel to display a first color frame (e.g., a green frame) around the first page image and display a second color frame (e.g., a red frame) around the second page image simultaneously so that the user can tell whether each of the page images has a blank block through the colors.

In other implementations, the page navigation area also comprises the second page image, which may or may not be adjacent to the first page image; however, the difference is that, the user originally desires to add the object image into the second page image but the second page image has no blank block available for accommodating the object image. In other words, the after touch signal is generated in response to pressing or clicking on a third region of the touch display panel which corresponds to the second page image, with the third region being a relative position of the second page image in the homescreen management interface. However, in this case, the second page image has no blank block. Therefore, the step S620 further comprises the following step (not shown): the processor determines that the second page image contains no blank block according to the after touch signal (i.e., in terms of a space of a second homescreen corresponding to the second page image), and thus adds the object image into the first page image which is closest to the second page image and still has a blank block. Herein, a blank block refers to a space block in a homescreen where widgets, applications or shortcuts can be stored.

In still other implementations, the page navigation area also comprises the second page image, which may or may not be adjacent to the first page image; however, the user originally desires to add the object image into the second page image, but the second page image has no blank block available for accommodating the object image. In other words, the after touch signal is generated in response to pressing or clicking on a third region of the touch display panel which corresponds to the second page image, with the third region being a relative position of the second page image in the homescreen management interface. However, in this case, the second page image has no blank block. Therefore, if the processor determines that neither the current second page image nor other page images (excluding the first page image) contain a blank block, then the step S620 further comprises the following step (not shown): the processor adds the first page image and enables the touch display panel to further display the first page image in the page navigation area, and meanwhile, the processor adds the object image into the first page image according to the fore touch signal and the after touch signal.

Similarly, in other implementations, the fore touch signal may be generated in response to pressing or clicking on the second region of the touch display panel which corresponds to the first page image, and the after touch signal may be generated in response to pressing or clicking on the first region of the touch display panel which corresponds to the object image. Then, the processor adds the object image into the first page image according to the fore touch signal and the after touch signal. Likewise, the object corresponding to the object image is also added into the first homescreen corresponding to the first page image.

In addition to the aforesaid steps, the homescreen management method of the fifth embodiment can also execute all the operations and functions of the handheld device set forth in the second embodiment. How the homescreen management method of the fifth embodiment executes these operations and functions can be readily appreciated by those of ordinary skill in the art based on the explanation of the second embodiment, and thus will not be further described herein.

As can be known from the description of the aforesaid embodiments, the present invention allows the user to manage homescreens in a plurality of different pressing ways through use of the homescreen management interface provided by the homescreen management program. With the present invention, the user can manage the homescreens more conveniently and more intuitively.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A handheld device, comprising:
   a touch display panel, being configured to display a user interface; and
   a processor electrically connected with the touch display panel, being configured to execute a homescreen management program according to a first touch signal sensed by the touch display panel, and enable the touch display panel to display a homescreen management interface corresponding to the homescreen management program, wherein the homescreen management interface comprises a page navigation area and a candidate object area, and wherein the page navigation area comprises a first page image corresponding to a first homescreen and a second page image corresponding to a second homescreen, and the candidate object area comprises an object image corresponding to an object;

wherein the touch display panel is further configured to sense a pressing action to generate a second touch signal for the object image, and the processor is further configured to determine spaces of the first homescreen and the second homescreen for adding the object, and the object image is added into the first page image according to the second touch signal in response to the processor determines that the first homescreen contains available blank block for adding the object and correspondingly add the object into the first homescreen, and the processor configured to highlight the second page image with a first color in response to the processor determines that the second homescreen contains no available blank block for adding the object, wherein the pressing action is to press a first region of the touch display panel that corresponds to the object image and to slide to a second region corresponding to the first page image along a path between the object and the first page image.

2. The handheld device as claimed in 1, wherein the touch display panel displays the object image at a gradually decreasing scale based on the pressing action.

3. The handheld device as claimed in claim 1, wherein the pressing action is to press a first region of the touch display panel that corresponds to the object image, and then press a second region of the touch display panel that corresponds to the first page image;

wherein the second touch signal comprises a fore touch signal and an after touch signal, and the touch display panel generates the fore touch signal when the touch display panel senses that a pressing corresponds to the first region of the touch display panel which corresponds to the object image, and generates the after touch signal when the touch display panel senses that a pressing corresponds to the second region which corresponds to the first page image.

4. The handheld device as claimed in claim 1, wherein the pressing action is to press a first region of the touch display panel that corresponds to the first page image and then press a second region of the touch display panel that corresponds to the object image;

wherein the second touch signal comprises a fore touch signal and an after touch signal, and the touch display panel generates the fore touch signal when it senses a pressing corresponds to the first region that corresponds to the first page image, and generates the after touch signal when it senses a pressing corresponds to the second region of the touch display panel that corresponds to the object image.

5. The handheld device as claimed in claim 1, wherein the processor adds the object image into the first page image according to the second touch signal and in response to the processor determines both that the second homescreen contains no available blank block for adding the object and that the first homescreen contains available blank block for adding the object.

6. The handheld device as claimed in claim 1, wherein the processor further configured to enable the touch display panel to display a second color to highlight the first page image in response to determining that the first homescreen contains available blank block for adding the object.

7. The handheld device as claimed in claim 1, wherein the first touch signal is generated by sensing a pressing on a region of the touch display panel which corresponds to a blank area of the user interface.

8. The handheld device as claimed in claim 1, wherein the touch display panel further configured to sense an another pressing action to generate a third touch signal for adding an another object image corresponding to the another object from the candidate object area to the second page image, and in response to the third touch signal and the processor determines that the second homescreen contains no available blank block for adding the another object, the another object image is moved back to the original position in the candidate object area.

9. The handheld device as claimed in claim 1, wherein the homescreen management interface further comprises a group classification area, and the group classification comprises a widget classification and an application classification.

10. A homescreen management method for use in a handheld device, the handheld device comprising a touch display panel and a processor electrically connected to the touch display panel, the touch display panel being configured to display a user interface, and the homescreen management method comprising the following steps of:

executing a homescreen management program by the processor according to a first touch signal sensed by the touch display panel; and enabling the touch display panel to display a homescreen management interface corresponding to the homescreen management program by the processor, wherein the homescreen management interface comprises a page navigation area and a candidate object area, and the page navigation area comprises a first page image corresponding to a first homescreen and a second page image corresponding to a second homescreen, and the candidate object area comprises an object image corresponding to an object;

sensing a pressing action to generate a second touch signal for the object image by the touch display panel;

determining spaces of the first homescreen and the second homescreen for adding the object, and adding the object image into the first page image according to the second touch signal in response to the processor determines that the first homescreen contains available blank block for adding the object and correspondingly adding the object into the first homescreen by the processor; and highlighting the second page image with a first color by the touch display panel in response to the processor determines that the second homescreen contains no available blank block for adding the object, wherein the pressing action is to press a first region of the touch display panel that corresponds to the object image and to slide to a second region corresponding to the first page image along a path between the object and the first page image.

11. The homescreen management method as claimed in claim 10, wherein the touch display panel displays the object image at a gradually decreasing scale based on the pressing action.

12. The homescreen management method as claimed in claim 10, wherein the pressing action is to press a first region of the touch display panel that corresponds to the object image, and then press a second region of the touch display panel that corresponds to the first page image;

wherein the second touch signal comprises a fore touch signal and an after touch signal, and the touch display panel generates the fore touch signal when the touch display panel senses that a pressing corresponds to the first region of the touch display panel which corresponds to the object image, and generates the after touch signal when the touch display panel senses that a pressing corresponds to the second region corresponding to the first page image.

13. The homescreen management method as claimed in claim 10, wherein the pressing action is to press a first region of the touch display panel that corresponds to the first page image and then press a second region of the touch display panel that corresponds to the object image;

wherein the second touch signal comprises a fore touch signal and an after touch signal, and the touch display panel generates the fore touch signal when the touch display panel senses that a pressing corresponds to the first region which corresponds to the first page image, and generates the after touch signal when the touch display panel senses that a pressing corresponds to the second region of the touch display panel which corresponds to the object image.

14. The homescreen management method as claimed in claim 10, wherein the object image is added into the first page image by the processor according to the second touch signal in response to the processor determines both that the second homescreen contains no available blank block for adding the object and that the first homescreen contains available blank block for adding the object.

15. The homescreen management method as claimed in claim 10, further comprises the following steps of:

enabling the touch display panel to display a second color to highlight the first page image by the processor in response to determining that the first homescreen contains available blank block for adding the object.

16. The homescreen management method as claimed in claim 10, wherein the first touch signal is generated by sensing a pressing on a region of the touch display panel which corresponds to a blank area of the user interface.

17. The homescreen management method as claimed in claim 10, wherein the touch display panel further senses an another pressing action to generate a third touch signal for adding an another object image corresponding to the another object from the candidate object area to the second page image, and the homescreen management further comprising:

moving back the another object image to the original position in the candidate object area by the processor in response to the third touch signal and the processor determines that the second homescreen contains no available blank block for adding the another object.

18. The homescreen management method as claimed in claim 10, wherein the homescreen management interface further comprises a group classification area, and the group classification comprises a widget classification and an application classification.

\* \* \* \* \*